C. E. WOODS.
SPEED GOVERNOR.
APPLICATION FILED AUG. 30, 1913.
1,192,026.
Patented July 25, 1916.
2 SHEETS—SHEET 1.
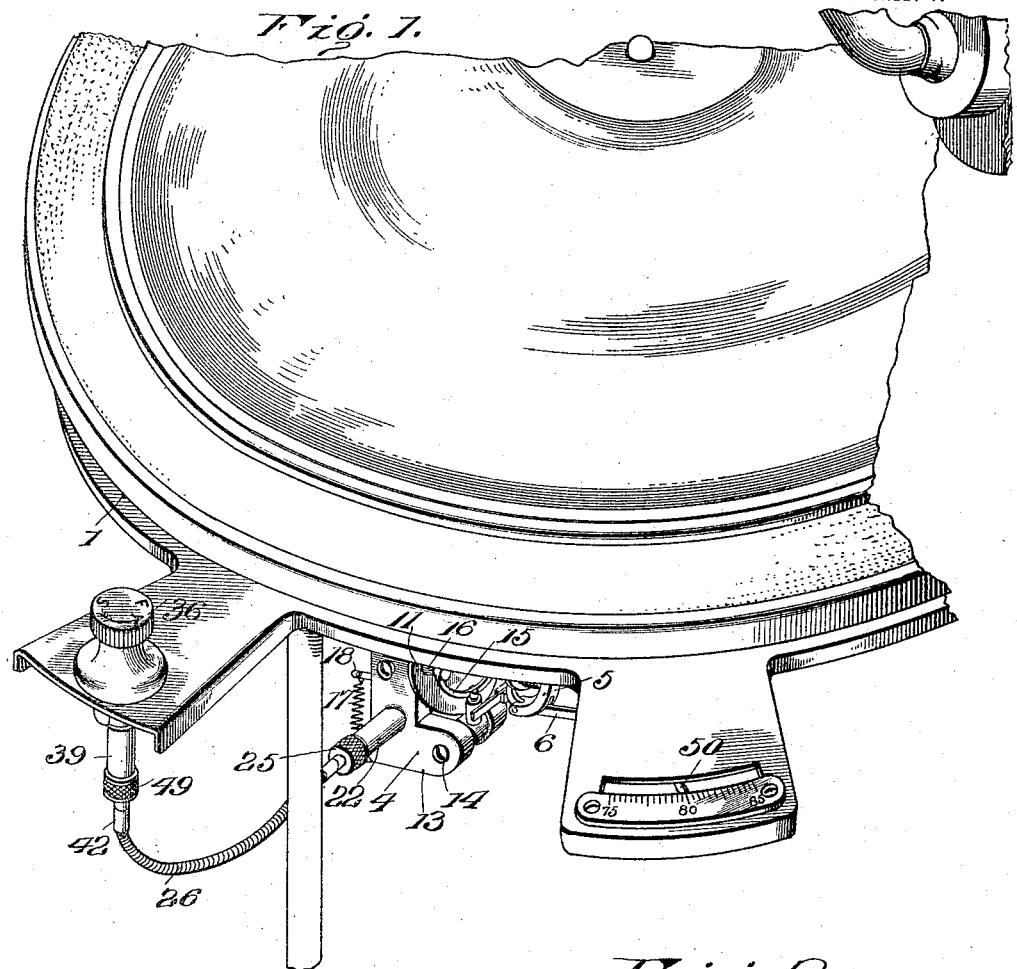
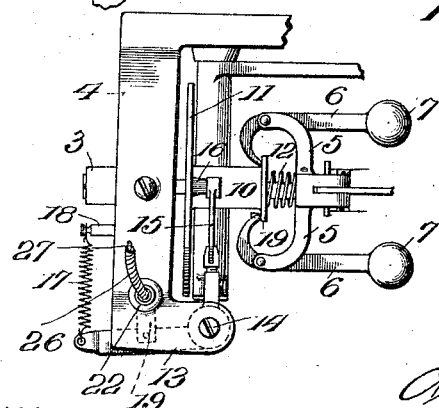

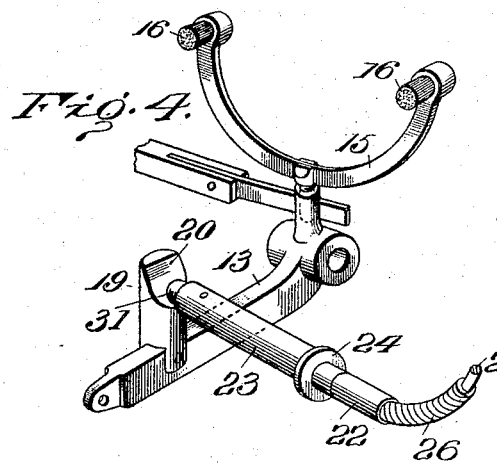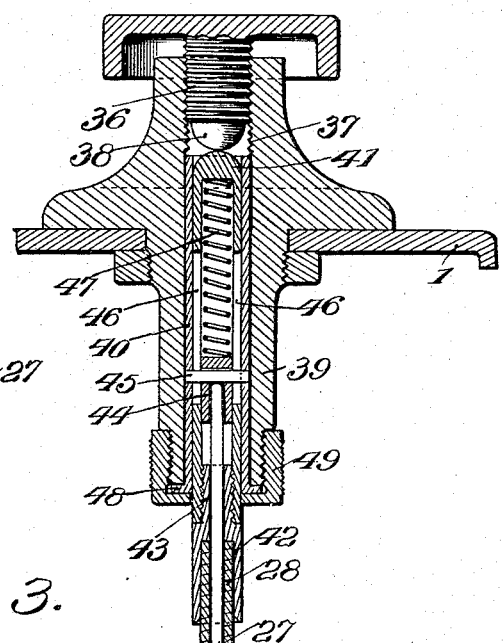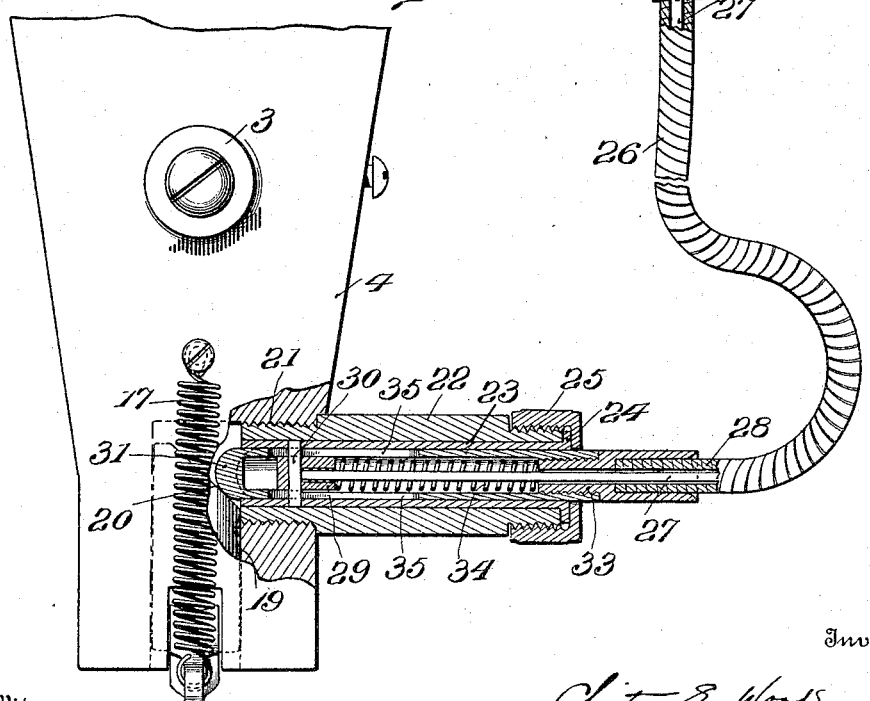

UNITED STATES PATENT OFFICE.

CLINTON E. WOODS, OF BRIDGEPORT, CONNECTICUT.

SPEED-GOVERNOR.

1,192,026.                                          Specification of Letters Patent.              Patented July 25, 1916.

Application filed August 30, 1913.   Serial No. 787,460.

*To all whom it may concern:*

Be it known that I, CLINTON E. WOODS, of Bridgeport, Connecticut, have invented a new and useful Improvement in Speed-Governors, which invention is fully set forth in the following specification.

This invention relates especially to speed governors for the motor mechanism of talking machines, although as to some of its broader features it is not limited to the speed governor part of a talking machine. Heretofore in such speed governors it has been proposed to mount centrifugally actuated weights upon a shaft driven by the motor, which weights under centrifugal action serve to move a disk into contact with a friction pad or pads, and the speed of the motor has been governed by adjusting the position of the friction pads by means of a micrometer screw acting through a complicated set of lever mechanism.

The present invention has for its object to eliminate such lever mechanism and substitute therefor a flexible member which may be more cheaply manufactured, readily assembled, and which shall more directly transmit the action of the micrometer screw to adjust the position of the friction pads with relation to the coöperating disk controlled by the centrifugal weights. The inventive idea involved is capable of receiving a variety of mechanical expressions, one of which, for the purpose of illustrating the invention, is shown in the accompanying drawings, but it is to be understood that such drawings are for the purpose of illustration only and are not designed to define the limits of the invention, reference being had to the appended claims for this purpose.

In said drawings:—Figure 1 is a broken perspective view of a talking machine with my invention applied thereto; Fig. 2 is a detail side elevation; Fig. 3 is a vertical sectional view; and Fig. 4 is a detail perspective, showing the means for applying the action of the flexible member to the friction pad support.

Referring to the drawings, in which like reference numerals indicate like parts, 1 is the motor-board of a talking-machine, which board may be of any suitable or desired construction and which supports on its under side a motor (not shown) of any suitable form, said motor being provided with a speed governor, part of which is shown in Fig. 2 in position under the motor-board 1. The motor-board 1 is formed of thin sheet-metal and is therefore more or less liable to deflection or distortion under stress. A shaft 3, Fig. 2, driven by the motor and having bearing in a bracket 4 depending from the motor-board 1, is provided with bracket arms 5, 5, secured to and revolving with the shaft 3, in which bracket arms are pivoted levers 6, 6, provided with centrifugal weights 7, 7, at one end, while the other ends of said levers are inturned and engage a collar 9 on a sleeve 10 keyed to but slidably mounted on the shaft 3 and provided at one end with a disk 11, said sleeve bearing at the end where the collar 9 is located against a spring 12 surrounding the shaft and reacting against a fixed abutment thereon. Mounted on a bell-crank lever 13, fulcrumed at 14, is a fork 15, Fig. 4, bearing two friction pads 16, 16, in position to be contacted by the disk 11 when the motor is in operation. A spring 17, Fig. 2, engages the outer end of one arm of the bell-crank lever 13 and is anchored at the other end to a lug 18 projecting from the bracket 4, said spring tending to elevate the arm of the bell-crank lever 13 to which it is attached and to thus throw the pads 16 away from the disk 11.

The construction thus far described forms no part of the present invention, which invention resides in the means for controlling the rocking action of the bell-crank lever 13 on its pivot 14 to adjust the position of the friction pads 16 with relation to the disk 11, which invention will now be described more in detail.

Referring to Fig. 4, 19 is an upwardly projecting pin or lug on the arm 13 of the bell-crank lever, which pin has a cam surface 20 on its upper end, and immediately opposite said cam surface a screw-threaded opening 21 is formed in the bracket arm 4 into which is inserted a screw-threaded sleeve 22. Within said sleeve is a lining tube 23 having a flange 24 at its outer end abutting the end of the sleeve 22, said lining tube being held in position by a cap 25 screw-threaded onto the outer end of the sleeve 22. 26 is a flexible member known in the art as a "Bowden wire", which consists of a central core of wire 27 surrounded by a closely coiled wire 28, the whole being so constructed that the two parts 27 and 28 are capable of movement the one relatively to the other, that is, the outer coil of wire 28 may be caused to slide upon the inner core of wire 27, or the inner core of wire 27 may be caused to slide within the outer coil of wire 28. As shown in the drawings, the inner wire 27 is exposed for a considerable distance at each end, that is, the outer coil 28 does not extend entirely to the ends, and at the end adjacent to the speed governor the inner wire 27 is anchored by solder or otherwise to a circular block of metal 29 and a pin 30 extends through said block and into the lining tube 23, so that the block 29, and with it the end of the core wire 27, is anchored to said tubular lining 23 and is therefore incapable of movement with relation thereto. The outer coil or sheath wire 28 is secured to a plunger 31 having a beveled or rounded nose in operative contact with the cam face 20 on the upwardly projecting pin 19 secured to the pad-operating lever 13, so that when movement is imparted to the sheath or coil 28, as hereinafter described, it actuates the plunger in a direction from right to left, Fig. 3, and depresses the outer end of the bell-crank lever 13 against the tension of the spring 17, thereby moving the friction pads 16, 16, toward the governor disk 11. Various means may be employed for securing the outer sheath 28 to the plunger 31. As here shown, the sheath or coil 28 is inserted in and secured in any suitable manner within a cup 32 having a screw-threaded tubular base 33 with the core wire 27 extending therethrough. This cup is screw-threaded into a tubular extension of the plunger 31 with a coiled spring 34 surrounding the core wire 27 and reacting between the plug 29 and the screw-threaded base 33 of the cup 32. The tubular portion of the plunger 31 is provided with two slots 35, 35, through which the pin 30 extends so that the plunger 31 is enabled to move past the pin 30, as will be readily understood.

Referring to Figs. 1 and 3, 36 is a micrometer screw mounted in a screw-threaded socket 37 mounted on the motor-board 1, as clearly shown in Fig. 1. Said micrometer screw has a rounded head 38, Fig. 3. 39 is a tubular sleeve secured in any suitable manner to the under side of the motor-board 1, and immediately beneath and in vertical alinement with the screw-threaded socket 37, within the sleeve 39, is a lining tube 40 extending entirely through the sleeve and the motor-board 1 and upwardly into proximity with the screw-threaded socket 37 of the micrometer screw 36. Within the tubular lining 40 is a plunger 41 having a curved or rounded end in contact with the curved head 38 of the micrometer screw 36, said tubular plunger head being secured at its lower end to the sheath coil 28 of the Bowden wire by means of a cup 42, into which said sheath extends and to which it is soldered or otherwise secured, said cup being provided with a base 43 screw-threaded into the lower end of the tubular plunger 41. The exposed end of the core wire 27 of the Bowden wire extends through said screw-threaded base or plug 43 and is soldered or otherwise secured to a block 44 secured by a pin 45 to the walls of the tubular lining 40, and the plunger 41 is provided with two slots 46, 46, to enable the plunger to move over and with relation to the pin 45. A spring 47 is located in the hollow plunger 41 between the upper end of the block 44 and the upper interior wall of the plunger 41, the action of said spring being to normally force the plunger upward into operative relation with the head 38 of the micrometer screw 36. The tubular shell 40 is provided at its lower end with a flange 48 and is held in position within the sleeve 39 by a cap 49 screwed onto said sleeve.

The operation of the device is as follows: As is usual in speed governors of the character herein described, reference being had particularly to Fig. 2, the speed of the machine will be checked by moving the pads 16 to the left in said figure (that is toward the disk 11) and will be permitted to increase by moving said pads 16 to the right in said figure (that is away from the disk), and this is accomplished by the present invention through the manipulation of the micrometer screw 36. In order to check the speed of the motor, the micrometer screw is screwed downward, thereby imparting downward movement to the plunger 41, which movement is transmitted through said plunger to the outer or sheath wire 28 of the Bowden wire, and this in turn produces a thrust from right to left, in the lower part of Fig. 3, on the plunger 31 which, acting on the cam 20, serves to depress said cam and the pin 19, thereby rocking the bell-crank lever 13 so as to cause the friction pads 16, 16, to move toward the friction disk 11, this action serving to increase the tension on springs 34 and 47. By shifting the pads 16 nearer to the disk 11, said disk will be caused to contact with the pads at a lower speed than was the case before the pads were shifted, and hence will act to prevent the machine from reaching as high a speed as was obtained before the pads were shifted. If, on the other hand, it is desired to increase the speed of the machine, the micrometer screw is turned so as to cause the screw to move upward in its screw-threaded socket 37 and the spring 17, acting through the lever 13 and the cam face 20 on the pin 19, forces the plunger 31 from left to right in Fig. 3, which movement is transmitted through the outer sheath wire 28 of the Bowden wire to the plunger 41, the tension of the springs 34 and 47 being thereby decreased.

It will be seen that by the present invention, even the slightest movement of the micrometer screw 36 will be transmitted to the friction pads without any lost motion of any kind, such as would be liable to occur through lever mechanism and the wearing of bearings, etc., and that the entire transmission device, outside of the couplings, is embraced in a single flexible Bowden wire. By this means a very fine adjustment of the parts may be readily secured, the operator being able to determine the speed by means of any suitable speedometer, indicated at 50 on Fig. 1.

As before stated, the motor-board 1 is formed of thin sheet-metal. The holes by means of which the bracket 4 and the socket 37 are secured to the motor-board are located as accurately as possible; but it is well known that, in the fabrication of sheet-metal devices, it is extremely difficult, if not in fact impossible to punch or drill holes with mathematical accuracy of location. Because of possible unavoidable inaccuracies in the locations of the apertures in the motor-board, or because of distortion of the motor-board, the relative positions of the bracket 4 and the socket 37 may vary slightly from the true predetermined positions. The Bowden wire 26 which is provided for connecting these two parts permits such minor variations in positions to occur without in any way affecting the efficiency of the apparatus, the Bowden wire because of its flexibility accommodating itself to said socket and bracket.

It will be clear from the drawings that the talking machine motor and the governor therefor are connected to the motor-board entirely independently of the adjusting device which includes the screw 36. Inasmuch as these parts are separately connected to the motor-board, and inasmuch as the motor-board itself is made of thin sheet metal and is therefore more or less flexible, it is impossible to so position the governor and the adjusting device that they maintain a mathematically exact predetermined relationship to each other. There may be variations due to errors in assembling or to bending of the metal of the motor-board, and the Bowden wire being flexible compensates for these variations, always maintaining a complete operative connection.

While, for the purpose of enabling the invention to be understood, the same has been described with considerable particularity and exactness as to the details of construction, proportions and relative arrangements of parts, it is to be understood that the invention is not necessarily limited to such proportions, details and relative arrangements, since the same may be varied within the limits of the appended claims, without departing from the invention.

What is claimed is:—

1. In a talking-machine, the combination of a speed governor for the motor, a screw for adjusting the same, a fixed threaded socket engaged by the screw, and means including a Bowden wire for transmitting the movement of the screw to the governor.

2. In a talking-machine, the combination of a speed governor for the motor comprising a friction disk and a coacting friction device, with a screw for adjusting the relation of said coacting device to said disk, a fixed threaded socket engaged by the screw, and means including a Bowden wire for transmitting the movement of the screw to said coacting friction device.

3. In a talking-machine, the combination of a speed governor for the motor comprising a motor-driven friction element and a coacting friction device, with a screw for adjusting the relation of said parts to each other, a fixed threaded socket engaged by the screw, and means including a Bowden wire for transmitting the movement of the said screw to one of said parts to effect corresponding changes in the speed of the motor.

4. In a talking-machine, the combination of a speed governor for the motor comprising a disk revolved by the motor and having translatory movement imparted thereto by centrifugal action and a friction pad coacting with said disk, with means for adjusting the relation of said pad with said disk, said means including a Bowden wire having one end in operative relation with the pad mounting, a screw in operative relation with one element of said wire for moving it with relation to the other element, and a fixed threaded socket engaged by the screw.

5. In a talking-machine, the combination of a speed governor for the motor comprising two members adjustable with relation to each other to control the speed of the motor, a Bowden wire having one end in operative relation with one of said members, and an adjusting device in operative relation with the other end of said Bowden wire and comprising a screw and a fixed threaded socket therefor, whereby movement of said screw is transmitted by said Bowden wire to adjust the relation between the members of the speed governor.

6. In a talking-machine, the combination of a speed governor for the motor, an adjusting screw and a fixed threaded socket engaged by the screw, with a Bowden wire in operative relation with said screw and governor.

7. In a talking-machine, the combination of a speed governor for the motor and an adjusting screw, with a Bowden wire having its inner member anchored against longitudinal movement, the outer member being in operative relation at one end with said screw and at the other end with the said governor.

8. In a talking-machine, the combination of a speed governor for the motor, and an adjusting screw, with a Bowden wire having both ends of its inner member anchored against movement and one end of its outer member in operative relation with said screw and the other end in operative relation with the governor.

9. In a talking machine, the combination of a horizontal thin sheet-metal motor-board, a motor, an adjustable governor for the motor secured to the motor-board, an adjusting device secured to the motor-board independently of the governor, and a Bowden wire engaged at one end with the governor and at the other end with the adjusting device, to transmit movement from the latter to the former, the said Bowden wire serving on account of its flexibility to compensate for possible inaccuracies in the relative locations of the governor and the adjusting device.

10. In a talking machine, the combination of a horizontal thin sheet-metal motor-board, a turn-table above the motor-board, a motor, an adjustable governor for the motor secured to the lower side of the motor-board beneath the turn-table, an adjusting device secured to the motor-board independently of the governor and projecting above the motor-board at one side of the turn-table, and a Bowden wire engaged at one end with the governor and at the other end with the adjusting device to transmit movement from the latter to the former, the said Bowden wire serving on account of its flexibility to compensate for possible inaccuracies in the relative locations of the governor and the adjusting device.

11. In a talking machine, the combination of an adjustable speed governor, an adjusting device, a Bowden wire having one end of its movable element engaging the governor and the other end normally engaging the movable element of the adjusting device, the said movable elements being freely separable, and a spring tending to hold the movable element of the wire in engagement with the movable element of the adjusting device.

12. In a talking machine, the combination of an adjustable speed governor, an adjusting device, a Bowden wire having one end of its movable element engaging the governor and the other end normally engaging the movable element of the adjusting device, the said movable elements being freely separable, and two springs positioned respectively at the ends of the movable element of the wire and each tending to hold the movable element of the wire in engagement with the movable element of the adjusting device.

13. In a talking machine, the combination of an adjustable speed governor, an adjusting device comprising a manually rotatable screw, a Bowden wire having one end of its movable element engaging the governor and the other end normally engaging the screw, the said movable element and screw being freely separable, and a spring tending to hold the movable element of the wire in engagement with the screw.

14. In a talking machine, the combination of an adjustable speed governor, an adjusting device comprising a manually rotatable screw having a rounded end, a Bowden wire having one end of its movable element engaging the governor and its other end rounded and normally engaging the screw, the said rounded ends being freely separable, and a spring tending to hold the rounded end of the wire in engagement with the rounded end of the screw.

15. In a talking machine, the combination of a speed governor having a movable adjusting element, an adjusting device, a Bowden wire having one end of its movable element engaging the adjusting device and its other end normally engaging the movable element of the governor, the said movable elements being freely separable, and a spring tending to hold the movable element of the governor in engagement with the movable element of the wire.

16. In a talking machine, the combination of a speed governor having a pivoted adjusting lever provided with a cam face at an angle to the pivotal axis, an adjusting device, a Bowden wire having one end of its movable element engaging the adjusting device and its other end normally engaging the cam face of the lever, the said cam face and movable element being freely separable, and a spring tending to hold the lever with its cam face in engagement with the movable element of the wire.

17. In a talking machine, the combination of a speed governor having a movable adjusting element, an adjusting device, a Bowden wire having one end of its movable element normally engaging the movable element of the adjusting device and its other end normally engaging the movable element of the governor, each of the said movable elements being freely separable from the next, a spring tending to hold the movable element of the wire in engagement with the movable element of the adjusting device, and a spring tending to hold the movable element of the governor in engagement with the movable element of the wire.

18. In a talking machine, the combination of an adjustable speed governor, an adjusting device, and a Bowden wire having one end in engagement with the adjusting device and the other end in engagement with the governor, the ends of both elements of the Bowden wire being freely detachable from the said adjusting device and the said governor respectively.

19. In a talking machine, the combination of an adjustable speed governor, an adjusting device, a Bowden wire having its outer element movable and in engagement at one end with the governor and at the other end with the adjusting device, and means for anchoring the inner element of the wire against movement with the outer element.

20. In a talking machine, the combination of an adjustable mechanism, an adjusting device, a Bowden wire having one end of its movable element engaging the adjustable mechanism and the other end engaging the movable element of the adjusting device, the said movable elements being freely separable, and a spring tending to hold the movable element of the wire in engagement with the movable element of the adjusting device.

21. In a talking machine, the combination of an adjustable mechanism, an adjusting device, a Bowden wire having one end of its movable element engaging the adjustable mechanism and the other end engaging the movable element of the adjusting device, the said movable elements being freely separable, and two springs positioned respectively at the ends of the movable element of the wire and each tending to hold the movable element of the wire in engagement with the movable element of the adjusting device.

22. In a talking machine, the combination of a mechanism having a movable adjusting element, an adjusting device, a Bowden wire having one end of its movable element engaging the adjustable element of the mechanism and the other end engaging the adjusting device, the said movable elements being freely separable, and a spring tending to hold the movable element of the mechanism in engagement with the movable element of the wire.

23. In a talking machine, the combination of a mechanism having a movable adjusting element, an adjusting device, a Bowden wire having one end of its movable element engaging the adjustable element of the mechanism and the other end engaging the movable element of the adjusting device, each of the said movable elements being freely separable from the next, a spring tending to hold the movable element of the mechanism in engagement with the movable element of the wire, and a spring tending to hold the movable element of the wire in engagement with the movable element of the adjusting device.

24. In a talking machine, the combination of an adjustable mechanism, an adjusting device, and a Bowden wire having one end of its movable element engaging the adjustable mechanism and the other end engaging the adjusting device, the ends of both elements of the Bowden wire being freely detachable from the adjustable mechanism and the adjusting device respectively.

25. In a talking machine, the combination of an adjustable mechanism, an adjusting device, a Bowden wire having its outer element movable and in engagement at one end with the adjustable mechanism and the other end with the adjusting device, and means for anchoring the inner element of the wire against movement with the outer element.

26. In a talking machine, the combination of an adjustable mechanism, an adjusting device, a Bowden wire having its outer element movable, hollow plungers secured to the ends of the outer element and in engagement respectively with the adjustable mechanism and with the adjusting device, the said plungers being slotted, and pins extending through the slots in the plungers for anchoring the inner element of the wire against movement with the outer element.

27. In a talking machine, the combination of an adjustable mechanism, an adjusting device, a Bowden wire having its outer element movable, hollow plungers secured to the ends of the outer element and in engagement respectively with the adjustable mechanism and with the adjusting device, tubes surrounding the plungers, means for securing the tubes against movement, and means for connecting the ends of the inner element of the wire to the said tubes respectively.

28. In a talking machine, the combination of an adjustable mechanism, an adjusting device, a Bowden wire having its outer element movable, hollow plungers secured to the ends of the outer element and in engagement respectively with the adjustable mechanism and with the adjusting device, flanged tubes surrounding the plungers, sleeves surrounding the tubes and engaging the flanges to hold the tubes in place, and means for connecting the ends of the inner element of the wire to the said tubes respectively.

29. In a talking machine, the combination of an adjustable mechanism, an adjusting device, a Bowden wire having its outer element movable, hollow plungers secured to the ends of the outer element and in engagement respectively with the adjustable mechanism and with the adjusting device, tubes surrounding the plungers and flanged at the ends remote from the ends of the plunger, sleeves surrounding the tubes and threaded at the ends adjacent the flanges, caps in threaded engagement with the threaded ends of the sleeves and engaging the flanges to hold the tubes in place, and means for connecting the ends of the inner element of the wire to the said tubes respectively.

30. In a talking machine, the combination of an adjustable mechanism, an adjusting device, a Bowden wire having its outer element movable, hollow plungers secured to the ends of the outer element and in engagement respectively with the adjustable mechanism and with the adjusting device, blocks within the plungers secured respectively to the ends of the inner element of the wire, means for holding the blocks against movement, and coil springs within the tubes and each engaging at one end with a block and at the other end reacting against the outer element of the wire.

In testimony whereof I have signed this specification in the presence of two subscribing witnesses.

CLINTON E. WOODS.

Witnesses:
 JOHN R. PETRIE,
 JOHN S. GRIFFITH.

Copies of this patent may be obtained for five cents each, by addressing the "Commissioner of Patents, Washington, D. C."

It is hereby certified that Letters Patent No. 1,192,026, granted July 25, 1916, upon the application of Clinton E. Woods, of Bridgeport, Connecticut, for an improvement in "Speed-Governors," were erroneously issued to the inventor, said Woods, whereas said Letters Patent should have been issued to *American Graphophone Company, of Bridgeport, Connecticut, a corporation of West Virginia*, as shown by the record of assignments in this office; and that the said Letters Patent should be read with this correction therein that the same may conform to the record of the case in the Patent Office.

Signed and sealed this 5th day of September, A. D., 1916.

[SEAL.]
F. W. H. CLAY,
*Acting Commissioner of Patents.*

Cl. 74—45.